United States Patent
Hsieh et al.

(10) Patent No.: US 10,642,257 B2
(45) Date of Patent: May 5, 2020

(54) TREE SEARCH-BASED SCHEDULING METHOD AND ELECTRONIC APPARATUS USING THE SAME

(71) Applicant: Industrial Technology Research Institute, Hsinchu (TW)

(72) Inventors: Tsung-Jung Hsieh, Tainan (TW);
Sen-Chia Chang, Hsinchu (TW);
Yao-Chung Hsu, Yunlin County (TW);
Che-Ming Kuo, Hsinchu County (TW);
I-Hsuan Chung, Taoyuan (TW)

(73) Assignee: Industrial Technology Research Institute, Hsinchu (TW)

( * ) Notice: Subject to any disclaimer, the term of this patent is extended or adjusted under 35 U.S.C. 154(b) by 199 days.

(21) Appl. No.: 15/888,096

(22) Filed: Feb. 5, 2018

(65) Prior Publication Data

US 2019/0146463 A1 May 16, 2019

(30) Foreign Application Priority Data

Nov. 16, 2017 (TW) .............................. 106139611 A

(51) Int. Cl.
*G05B 19/418* (2006.01)
*G06F 9/54* (2006.01)
*G06Q 10/06* (2012.01)

(52) U.S. Cl.
CPC ....... *G05B 19/41865* (2013.01); *G06F 9/546* (2013.01); *G06Q 10/06311* (2013.01);
(Continued)

(58) Field of Classification Search
CPC .... G05B 19/41865; G05B 2219/32252; G05B 2219/34379; G05B 2219/45031;
(Continued)

(56) References Cited

U.S. PATENT DOCUMENTS 5,099,431 A * 3/1992 Natarajan ............... H01L 22/20
700/105
6,269,353 B1 7/2001 Sethi et al.
(Continued)

FOREIGN PATENT DOCUMENTS

CN 102035698 4/2011
CN 102622667 8/2012
(Continued)

OTHER PUBLICATIONS

"Office Action of Taiwan Counterpart Application", dated Jun. 27, 2018, p. 1-p. 4.
(Continued)

*Primary Examiner* — M. N. Von Buhr
(74) *Attorney, Agent, or Firm* — JCIPRNET

(57) ABSTRACT

A tree search-based scheduling method and an electronic apparatus are provided. In the method, multiple order lists are received and a schedule is initialized, wherein each order list includes multiple production operations. In each order list, a first production operation which has not been joined into the schedule yet is selected, such that multiple prior operations are selected. An execution priority of the prior operations is calculated according to multiple dispatching rules, and multiple candidate operations are selected from the prior operations according to the execution priority. Afterwards, the candidate operations are listed as a next operation of the schedule respectively, and a scheduling simulation is performed according to the dispatching rules to obtain multiple scheduling indicators of the candidate operations. Scheduling is performed according to the scheduling indicators.

14 Claims, 12 Drawing Sheets

(52) U.S. Cl.
CPC ............ *G05B 2219/32252* (2013.01); *G05B 2219/34379* (2013.01)

(58) Field of Classification Search
CPC .......... G05B 2219/32306; G05B 2219/32269; G05B 2219/32266; G06F 9/546; G06Q 10/06311; G06Q 10/0631; G06Q 50/04
See application file for complete search history.

(56) References Cited

U.S. PATENT DOCUMENTS

| | | | |
|---|---|---|---|
| 7,370,326 | B2 | 5/2008 | Jones et al. |
| 7,848,836 | B2 | 12/2010 | Gozzi et al. |
| 9,071,555 | B1 | 6/2015 | Sgouros et al. |
| 2007/0021998 | A1* | 1/2007 | Laithwaite ............ G06Q 10/06 705/7.13 |
| 2008/0216077 | A1* | 9/2008 | Emani ............ G05B 19/41865 718/102 |
| 2010/0217418 | A1 | 8/2010 | Fontanot |
| 2012/0050787 | A1* | 3/2012 | Balduccini ............ G06F 3/1212 358/1.15 |
| 2014/0148924 | A1* | 5/2014 | Brak ...................... G05B 19/02 700/12 |
| 2016/0071016 | A1 | 3/2016 | Goyal et al. |
| 2016/0103710 | A1* | 4/2016 | Shachar .................. H04L 49/00 718/102 |
| 2016/0189266 | A1* | 6/2016 | Johnson ............ G06Q 30/0605 705/26.2 |
| 2018/0080949 | A1* | 3/2018 | Jost .................... G01N 35/0092 |
| 2018/0137168 | A1* | 5/2018 | Hama ............... G06F 16/24534 |

FOREIGN PATENT DOCUMENTS

| | | |
|---|---|---|
| TW | 483039 | 4/2002 |
| TW | I230880 | 4/2005 |
| TW | 200630764 | 9/2006 |

OTHER PUBLICATIONS

Jen-Jai Chou, et al., "A New MCTS-Based Algorithm for Multi-Objective Flexible Job Shop Scheduling Problem," Conference on Technologies and Applications of Artificial Intelligence (TAAI), IEEE, Nov. 2015, pp. 136-141.

* cited by examiner

| dispatching rule \ scheduling goal | minimum total completion time | minimum order delay time | highest accurate delivery rate | ... |
|---|---|---|---|---|
| SPT | ●●● | ●●● | ●●● | ... |
| FIFO | ●●● | ● | ●●● | ... |
| AT | ●● | ●●● | ●●● | ... |
| AT-RPT | ●●● | ●●●●● | ●●● | ... |
| MDD | ● | ●●● | ●●● | ... |
| PT+WINQ | | ●●● | | ... |
| ... | ... | ... | ... | ... |
| PT+WINQ+SL | | ●●● | | ... |
| PT+WINQ+AT | ●●● | ● | ●●●●● | ... |
| PT+WINQ+AT+SL | ● | ● | | ... |
| RR | | ●●● | ●●● | ... |
RL
FIG. 3
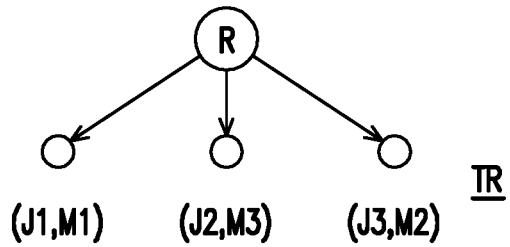
TR
FIG. 4A
| dispatching rule | (J1,M1) | (J2,M3) | (J3,M2) |
|---|---|---|---|
| SPT | 3 | 2 | 1 |
| FIFO | 1 | 1 | 1 |
| AT-RPT | 2 | 1 | 3 |
| execution priority | 2 | 1.333 | 1.667 |
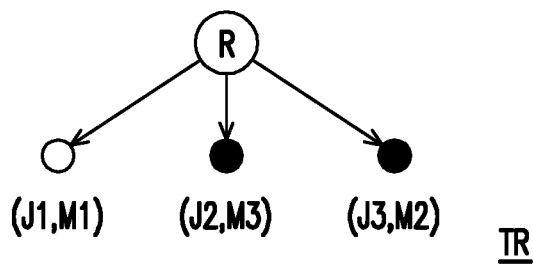
TR
FIG. 4B

| dispatching rule | (J1,M1) | (J2,M3) | (J3,M2) |
|---|---|---|---|
| SPT | 3 | 2 | 1 |
| MDD | 3 | 2 | 1 |
| AT-RPT | 2 | 1 | 3 |
| execution priority | 2.666667 | 1.666667 | 1.666667 |

| dispatching rule | (J2,M3) | (J3,M2) |
|---|---|---|
| SPT | 63 | 42 |
| MDD | 49 | 49 |
| AT-RPT | 42 | 42 |
| average | 51.3 | 44.3 |

TREE SEARCH-BASED SCHEDULING METHOD AND ELECTRONIC APPARATUS USING THE SAME

CROSS-REFERENCE TO RELATED APPLICATION

This application claims the priority benefit of Taiwan application serial no. 106139611, filed on Nov. 16, 2017. The entirety of the above-mentioned patent application is hereby incorporated by reference herein and made a part of this specification.

TECHNICAL FIELD

The disclosure relates to a scheduling method and an electronic apparatus using the method.

BACKGROUND

For manufacturers of semiconductors, computer equipment, electronics, circuit boards, or the like, the scheduling systems or software tools currently available on the market are expensive and cannot be customized to meet different requirements.

At present, there are three main cores of scheduling technology, namely, exact method, dispatching rule, and metaheuristic. An example of the exact method is branch and bound, which is commonly used by laboratories or research institutes. Although it can obtain the best solution to a schedule, it will take an extremely long time and thus is not suitable for industrial use. An example of the dispatching rule is the G&T (Giffler and Thompson) algorithm, by which a schedule can be completed in a short time but the quality is not satisfactory. An example of the metaheuristic search method is genetic algorithm. It can complete a schedule with good quality in a short time for cases where the scales of the problems (number of work orders, number of machines, etc.) are smaller, but as the scales increase, the processing time required will increase significantly.

Thus, it is a common goal for those skilled in the art to develop a scheduling method that is accurate, requires a shorter processing time, and is capable of dealing with different needs of the users.

SUMMARY

The disclosure provides a tree search-based scheduling method and an electronic apparatus using the method, by which favorable scheduling quality is achieved in a reasonable time.

A tree search-based scheduling method according to an embodiment of the disclosure is adapted for an electronic apparatus. In the method, first, a plurality of order lists are received and a schedule is initialized, wherein each of the order lists includes a plurality of production operations. The method further includes selecting the production operation, which has not yet been joined into the schedule and is sorted foremost, in each of the order lists to select a plurality of prior operations. An execution priority of the prior operations is calculated according to a plurality of dispatching rules, and a plurality of candidate operations are selected from the prior operations according to the execution priority. Thereafter, the candidate operations are the next operations available for scheduling in the schedule, and a scheduling simulation is performed according to the dispatching rules, so as to acquire a plurality of scheduling indicators of the candidate operations. Then, the schedule is performed according to the acquired scheduling indicators.

An electronic apparatus according to an embodiment of the disclosure includes a receiving device, a storage device, and a processor. The receiving device is configured to receive data. The storage device is configured to store a plurality of modules. The processor is coupled to the receiving device and the storage device, and configured to load and execute the modules. The modules include a data acquisition module, a tree scheduling module, a node filtering module, and a node selection module. The data acquisition module is configured to receive a plurality of order lists via the receiving device, wherein each of the order lists includes a plurality of production operations. The tree scheduling module is configured to initialize a schedule. The node filtering module is configured to select the production operation, which has not yet been joined into the schedule and is sorted foremost, in each of the order lists to acquire a plurality of prior operations of the order lists. The node filtering module is further configured to calculate an execution priority of the prior operations according to a plurality of dispatching rules, and select a plurality of candidate operations from the prior operations according to the execution priority. The node selection module is configured to list the candidate operations as a next operation available for scheduling respectively, and perform a scheduling simulation on the candidate operations according to the selected dispatching rules to acquire a plurality of scheduling indicators of the candidate operations. The tree scheduling module is further configured to perform the schedule according to the scheduling indicators.

Based on the above, in the tree search-based scheduling method and the electronic apparatus provided in the embodiments of the disclosure, multiple dispatching rules are used simultaneously, and the risk of erroneous scheduling is reduced effectively by adopting group decision-making based dispatching rules. In addition, the dispatching rules used in the embodiments of the disclosure are selectable, and the scheduling is performed level by level by a tree search algorithm. Thus, the scheduling may be performed to meet the needs of the user.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 3 is a schematic diagram of a rule library according to an embodiment of the disclosure.

FIG. 4A to FIG. 4F are schematic diagrams showing a scheduling method according to an embodiment of the disclosure.

DESCRIPTION OF THE EMBODIMENTS

According to a scheduling method provided in the embodiments of the disclosure, multiple dispatching rules are used simultaneously, so as to effectively reduce the risk of erroneous scheduling by group decision-making. Particularly, according to the disclosure, the dispatching rules used during the scheduling may be selected from a rule library according to the requirements and goals of the current schedule (e.g., minimum total completion time and minimum number of late delivery), and after the dispatching rules to be used are selected, scheduling is performed level by level by a tree search algorithm. Therefore, the scheduling method provided in the embodiments of the disclosure makes it possible to schedule production operations of multiple order lists according to different needs of the user as well as complete the scheduling in a reasonable processing time with favorable scheduling quality.

Figure 1:
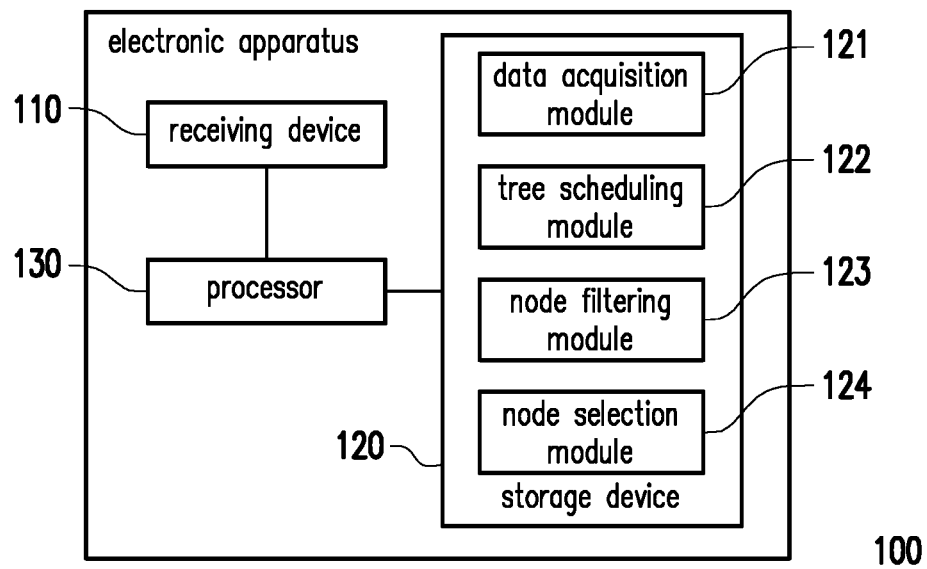
FIG. 1 is a schematic block diagram of an electronic apparatus according to an embodiment of the disclosure.

FIG. 1 is a schematic block diagram of an electronic apparatus according to an embodiment of the disclosure. Referring to FIG. 1, the scheduling method of the disclosure is adapted for an electronic apparatus 100. The electronic apparatus 100 is an electronic apparatus that has computing capability, such as a personal computer (PC), a work station, a server, a notebook computer, a personal digital assistant (PDA), a smart phone, and a tablet PC, for example, but the disclosure is not limited thereto. The electronic apparatus 100 includes a receiving device 110, a storage device 120, and a processor 130.

The receiving device 110 is configured to receive various types of data from outside. In an embodiment, the receiving device 110 may be configured to receive a plurality of order lists to be scheduled, for example. In another embodiment, the receiving device 110 may be configured to receive a scheduling goal for scheduling (e.g., minimum total completion time, highest accurate delivery rate, and so on), for example. The receiving device 110 is an input device, such as a keyboard, a mouse, a microphone, or a touch screen of the electronic apparatus 100, or is a data acquisition card or a network interface card, for example, but the disclosure is not limited thereto.

The storage device 120 is configured to store data and may be a fixed or movable random access memory (RAM) in any form, a read-only memory (ROM), a flash memory, a hard drive, other similar devices, or a combination of these devices, for example, for recording a plurality of modules to be executed by the processor 130. The modules may be loaded to the processor 130 for scheduling the order lists received by the receiving device 110.

The processor 130 may be a central processing unit (CPU), a programmable microprocessor for general or special purposes, a digital signal processor (DSP), a programmable controller, an application specific integrated circuit (ASIC), a programmable logic device (PLD), other similar devices, or a combination of these devices, for example. The processor 130 is coupled to the receiving device 110 and the storage device 120 and may access and execute the modules recorded in the storage device 120 for scheduling the order lists received by the receiving device 110.

The modules at least include a data acquisition module 121, a tree scheduling module 122, a node filtering module 123, and a node selection module 124. The modules are firmware or computer programs, for example, to be loaded to the processor 130 for executing a tree search-based scheduling function of this embodiment of the disclosure on the order lists. Steps of the tree search-based scheduling method of the disclosure are described in detail hereinafter with reference to the following embodiments.

Figure 2:
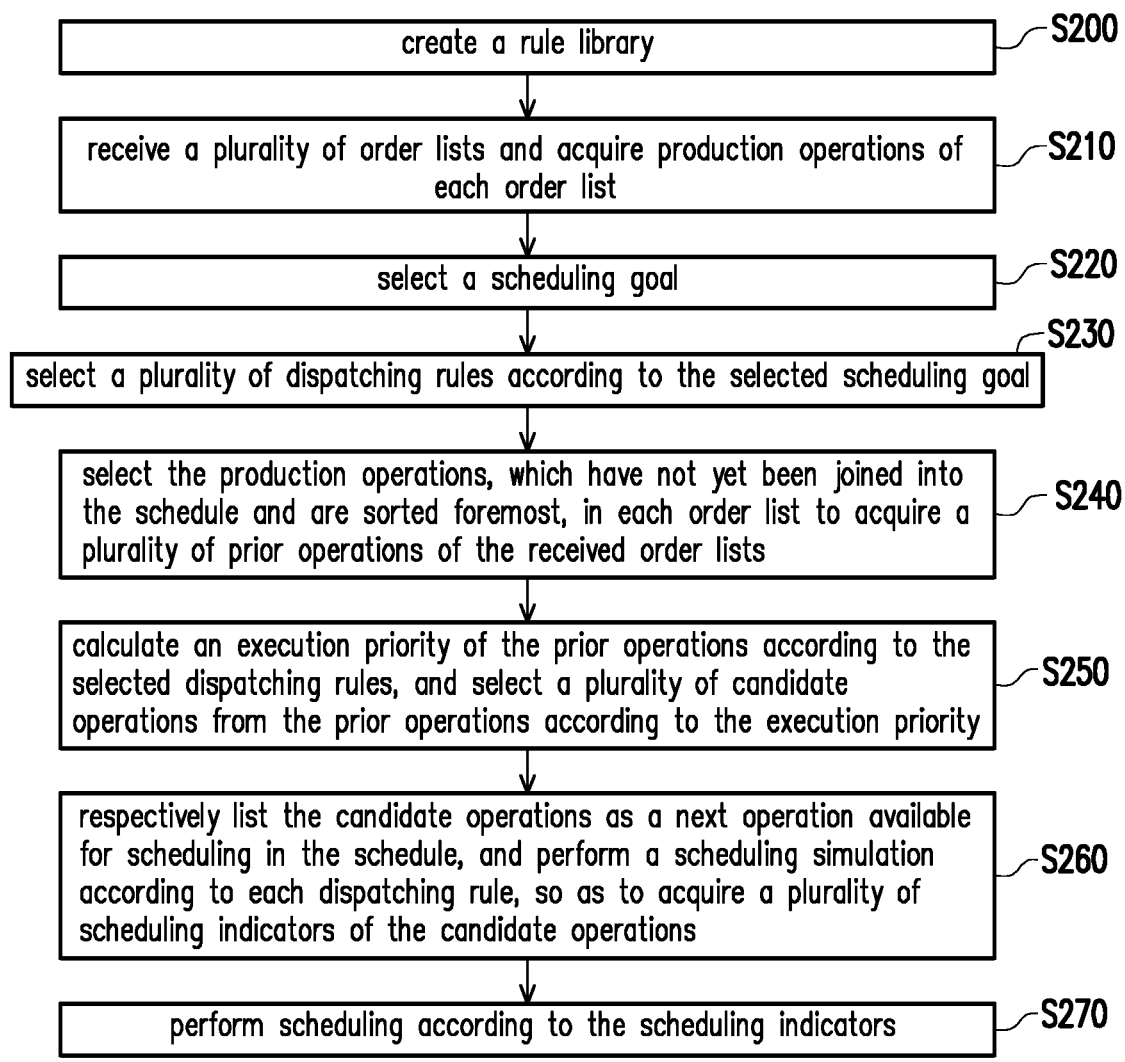
FIG. 2 is a flowchart of a scheduling method according to an embodiment of the disclosure.

FIG. 2 is a flowchart of the scheduling method according to an embodiment of the disclosure. Referring to FIG. 2, the method of this embodiment is adapted for the electronic apparatus 100 of the embodiment of FIG. 1. Steps of the tree search-based scheduling method of the disclosure are described in detail hereinafter with reference to the devices in the electronic apparatus 100.

In Step S200, the processor 130 creates a rule library and records the rule library in the storage device 120. In an embodiment, the rule library is, for example, a database which records a plurality of available dispatching rules and a plurality of correlations between each available dispatching rule and a plurality of scheduling goals.

FIG. 3 is a schematic diagram of the rule library according to an embodiment of the disclosure. Referring to FIG. 3, the available dispatching rules recorded in the rule library RL include shortest processing time (SPT), first in first out (FIFO), arrival time (AT), arrival time-total remaining processing time (AT-RPT), modified due date (MDD), and so on, for example. Those skilled in the art may understand the available dispatching rules described above from documents related to dispatching rules and thus details thereof are not repeated hereinafter. The scheduling goals include minimum total completion time, minimum order delay time, highest accurate delivery rate, and so on, for example. Likewise, those skilled in the art may understand the scheduling goals described above from documents related to dispatching rules and thus details thereof are not repeated hereinafter.

In this embodiment, the correlations between each available dispatching rule and the scheduling goals are represented by the number of black dots. More black dots indicate a higher correlation while fewer black dots indicate a lower correlation. Specifically, more black dots mean that the corresponding available dispatching rule is more likely to meet the corresponding scheduling goals while fewer black dots mean that there is a lower correlation between the corresponding available dispatching rule and the corresponding scheduling goals. The correlations recorded in the rule library RL may be collected and sorted out from the documents related to dispatching rules, for example, but the disclosure is not limited thereto.

As shown in FIG. 3, the correlations between the SPT rule and the minimum total completion time, the minimum order delay time, and the highest accurate delivery rate are all three black dots; the correlations between the FIFO rule and the minimum total completion time, the minimum order delay time, and the highest accurate delivery rate are three, one, and three black dots respectively; the correlations between the AT-RPT rule and the minimum total completion time, the minimum order delay time, and the highest accurate delivery rate are three, five, and three black dots respectively; and the correlations between the MDD rule and the minimum total completion time, the minimum order delay time, and the highest accurate delivery rate are one, three, and three black dots respectively.

From another aspect, for the same scheduling goal, the available dispatching rule that has more black dots means that it is more likely to meet this scheduling goal. For example, using the SPT rule is more likely to meet the scheduling goal of minimum total completion time than using the MDD rule; using the MDD rule is more likely to meet the scheduling goal of minimum order delay time than using the FIFO rule, and so on.

It should be noted that the content of the rule library RL of the embodiment of FIG. 3 is obtained via the data acquisition module 121 through statistics of the documents related to dispatching rules from 1994 to the present, and is used here as an example. The disclosure is not intended to limit the content and representation of the rule library RL. Those skilled in the art may present, add, or modify the content of the rule library RL according to their needs.

In addition, the disclosure is not intended to limit how the rule library RL is created. In other embodiments, for example, the electronic apparatus 100 may receive the rule library RL in advance via the receiving device 110 and store the rule library RL in the storage device 120, and skip Step S200 and directly start the tree search-based scheduling method of the disclosure from Step S210.

In Step S210, the processor 130 receives a plurality of order lists via the receiving device 110 and acquires production operations of each order list. Specifically, the data acquisition module 121 of the processor 130 receives the order lists via the receiving device 110. One order list is for a product, for example, and includes a plurality of production operations and a processing time of each production operation, and the data acquisition module 121 acquires the aforementioned information from the received order list.

As shown in the following Table 1, in this embodiment, the receiving device 110 receives three order lists J1, J2, and J3. The order list J1 includes two operations; the order list J2 includes three operations; and the order list J3 includes two operations. In terms of the order list J1, the two operations are to execute a machine M1 for 12 time units and execute a machine M4 for 15 time units, and so on. The number in the parentheses represents the number of time units required.

TABLE 1

| J1 | M1(12) | M4(15) |        |
|----|--------|--------|--------|
| J2 | M3(10) | M2(9)  | M4(15) |
| J3 | M2(9)  | M1(12) |        |

It should be noted that, in this embodiment, execution of one production operation occupies a certain production machine, for example. Therefore, two or more production operations that use the same production machine are not executed at the same time.

After receiving the order lists, in Step S220, the processor 130 selects at least one scheduling goal. In this embodiment, for example, the selected scheduling goal is one or more scheduling goals recorded in the rule library RL. For example, the user may discuss with the manufacturers to understand their needs and then input the scheduling goal according to their needs. The receiving device 110 receives a selection signal from outside (inputted by the user, for example). In this embodiment, the selection signal is to select the minimum total completion time as the scheduling goal, for example. In another embodiment, in addition to the minimum total completion time, the scheduling goals may further include the minimum order delay time, and so on. The disclosure is not intended to limit the scheduling goals that may be selected for scheduling. Those who implement the disclosure may select one or more scheduling goals according to their needs, so as to be more flexible during scheduling.

In Step S230, the processor 130 selects a plurality of dispatching rules from the rule library RL according to the selected scheduling goal. Specifically, for example, the processor 130 selects the dispatching rules that are highly correlated with the selected scheduling goal according to the correlations recorded in the rule library RL via the node filtering module 123. In this embodiment, the processor 130 selects three dispatching rules. Nevertheless, the disclosure is not intended to limit the number of the dispatching rules that are selected. In other embodiments, for example, the dispatching rules may be selected from the rule library RL by the user.

Referring to FIG. 3, since the scheduling goal in this embodiment is the minimum total completion time, the processor 130 selects three rules, i.e., SPT, FIFO, and AT-RPT. After the dispatching rules are selected, a schedule is initialized for the production operations of the order list. In this embodiment, the processor 130 initializes the schedule via the tree scheduling module 122, so as to create a root node of a tree topology.

In Step S240, the processor 130 selects the production operations, which have not yet been joined into the schedule and are sorted foremost, in each order list to acquire a plurality of prior operations of the received order lists. Specifically, the processor 130 selects the first production operation that is to be scheduled in each order list via the node filtering module 123 to develop nodes of the first level of the tree topology TR.

FIG. 4A to FIG. 4F are schematic diagrams showing a scheduling method according to an embodiment of the disclosure. FIG. 4A to FIG. 4F illustrate the scheduling method of this embodiment based on the three order lists J1, J2, and J3 in Table 1 as an example. In this embodiment, except for the root node R, one node in the tree topology TR represents one production operation. The execution times of the nodes that are joined into the schedule in a lower level are not earlier than the execution times of the nodes that are joined into the schedule in an upper level. It should be noted that, in the embodiment of the disclosure, each node represents one production operation in the form of (order list, machine). Referring to Table 1 again, take the order list J1 as an example, the first production operation is to execute the machine M1, which is thus represented as (J1, M1), the second production operation is to execute the machine M4, which is thus represented as (J1, M4), and so on.

As shown in FIG. 4A, when no production operation is joined into the schedule, the first production operations to be scheduled in the three order lists J1, J2, and J3 of Table 1 are (J1, M1), (J2, M3), and (J3, M2) respectively. Therefore, the node filtering module 123 of the processor 130 selects the prior operations (J1, M1), (J2, M3), and (J3, M2) from the production operations of the three order lists J1, J2, and J3 in Step S240, and then takes the root node R as the starting node to start to develop nodes in the first level of the tree topology. In this embodiment, the nodes of the first level of the tree topology TR are the prior operations (J1, M1), (J2, M3), and (J3, M2).

In Step S250, the processor 130 calculates an execution priority of the prior operations according to the selected dispatching rules, and selects a plurality of candidate operations from the prior operations according to the execution priority. Specifically, the processor 130 sorts the prior operations respectively according to the dispatching rules via the node filtering module 123, so as to acquire the candidate operations.

As shown in FIG. 4B, when the prior operations (J1, M1), (J2, M3), and (J3, M2) are sorted according to the SPT rule, the processing time is used as a priority indicator. It is known from each order list of Table 1 that, since the processing times required by the prior operations (J1, M1), (J2, M3), and (J3, M2) are 12, 10, and 9 time units respectively, the prior operations (J1, M1), (J2, M3), and (J3, M2) are sorted as 3, 2, and 1 respectively. In other words, when scheduling is performed according to the SPT rule, the operation (J3, M2) has priority over the operation (J2, M3), and the operation (J2, M3) has priority over the operation (J1, M1).

When the prior operations (J1, M1), (J2, M3), and (J3, M2) are sorted according to the FIFO rule, since there is no operation in the schedule, the prior operations (J1, M1), (J2, M3), and (J3, M2) are sorted the same. In this embodiment, the operations that are sorted the same are set as 1, but not limited thereto.

When the prior operations (J1, M1), (J2, M3), and (J3, M2) are sorted according to the AT-RPT rule, for example, the processor 130 calculates a difference between the arrival time and the total remaining processing time respectively to be used as the priority indicator. For example, the arrival time of the prior operation (J1, M1) is 0 and the total remaining processing time is 27 (12+15=27). Therefore, the priority indicator of the prior operation (J1, M1) is −27 (0−(12+15)=−27). Likewise, the priority indicator of the prior operation (J2, M3) is −34 (0−(10+5+9)=−34); and the priority indicator of the prior operation (J3, M2) is −21 (0−(12+9)=−21). In this embodiment, the operation that has the smaller priority indicator has higher priority, and therefore the prior operations (J1, M1), (J2, M3), and (J3, M2) are sorted as 2, 1, and 3 respectively. In other words, when scheduling is performed according to the AT-RPT rule, the operation (J2, M3) has priority over the operation (J1, M1), and the operation (J1, M1) has priority over the operation (J3, M2).

It should be noted that the priority indicators corresponding to different dispatching rules are calculated in different manners, and those skilled in the art may understand the calculation method of the priority indicator corresponding to each dispatching rule from the documents related to dispatching rules, and thus details thereof are not repeated hereinafter.

Thereafter, the processor 130 integrates a plurality of sorted results of the prior operations corresponding to each dispatching rule via the node filtering module 123, so as to acquire the execution priority.

It is known from FIG. 4B that the sorted results of the prior operation (J1, M1) corresponding to the SPT, FIFO, and AT-RPT rules are 3, 1, and 2 respectively; the sorted results of the prior operation (J2, M3) corresponding to the SPT, FIFO, and AT-RPT rules are 2, 1, and 1 respectively; and the sorted results of the prior operation (J3, M2) corresponding to the SPT, FIFO, and AT-RPT rules are 1, 1, and 3 respectively. In this embodiment, the processor 130 calculates an average of the sorted results of the prior operations (J1, M1), (J2, M3), and (J3, M2), so as to acquire the execution priority. Specifically, the average of the sorted results of the prior operation (J1, M1) is 2; the average of the sorted results of the prior operation (J2, M3) is 1.333; and the average of the sorted results of the prior operation (J3, M2) is 1.667. Therefore, the execution priority of the prior operations (J1, M1), (J2, M3), and (J3, M2) is 2, 1.333, and 1.667.

In another embodiment, for example, the processor 130 may calculate a weighted average of the sorted results of the prior operations corresponding to each dispatching rule, instead of the average, so as to acquire the execution priority. For example, the processor 130 may set a weight according to the correlations between each dispatching rule and the scheduling goals. When the dispatching rule has a higher correlation with the scheduling goals, the weight is set higher; and when the dispatching rule has a lower correlation with the scheduling goals, the weight is set lower. Nevertheless, the disclosure is not limited thereto.

In some embodiments, for example, two or more prior operations may have the same lowest execution priority. In such a case, for example, the processor 130 may filter one of them randomly, or modify the set weight for recalculation. Nevertheless, the disclosure is not limited thereto.

Then, the processor 130 selects the candidate operations from the prior operations according to the execution priority via the node filtering module 123. In other words, the node filtering module 123 filters out at least one prior operation according to the execution priority. In this embodiment, the processor 130 filters out one prior operation via the node filtering module 123. Nevertheless, the disclosure is not intended to limit the number of the prior operations that are filtered.

Referring to FIG. 4B again, it is known from the acquired execution priority that the prior operation (J1, M1) has the lowest execution priority. Therefore, the processor 130 filters out the prior operation (J1, M1) and keeps the prior operations (J2, M3) and (J3, M2) as the candidate operations.

In Step S260, the processor 130 respectively lists the candidate operations as a next operation available for scheduling in the schedule, and performs a scheduling simulation according to each dispatching rule, so as to acquire a plurality of scheduling indicators of the candidate operations. Specifically, the processor 130 respectively lists the candidate operations as the next operation available for scheduling in the schedule via the node selection module 124 in the storage device 120, and then performs the scheduling simulation for the candidate operations respectively according to the dispatching rules, so as to calculate a plurality of simulated scheduling results of the candidate operations corresponding to each dispatching rule.

Figure 4C:
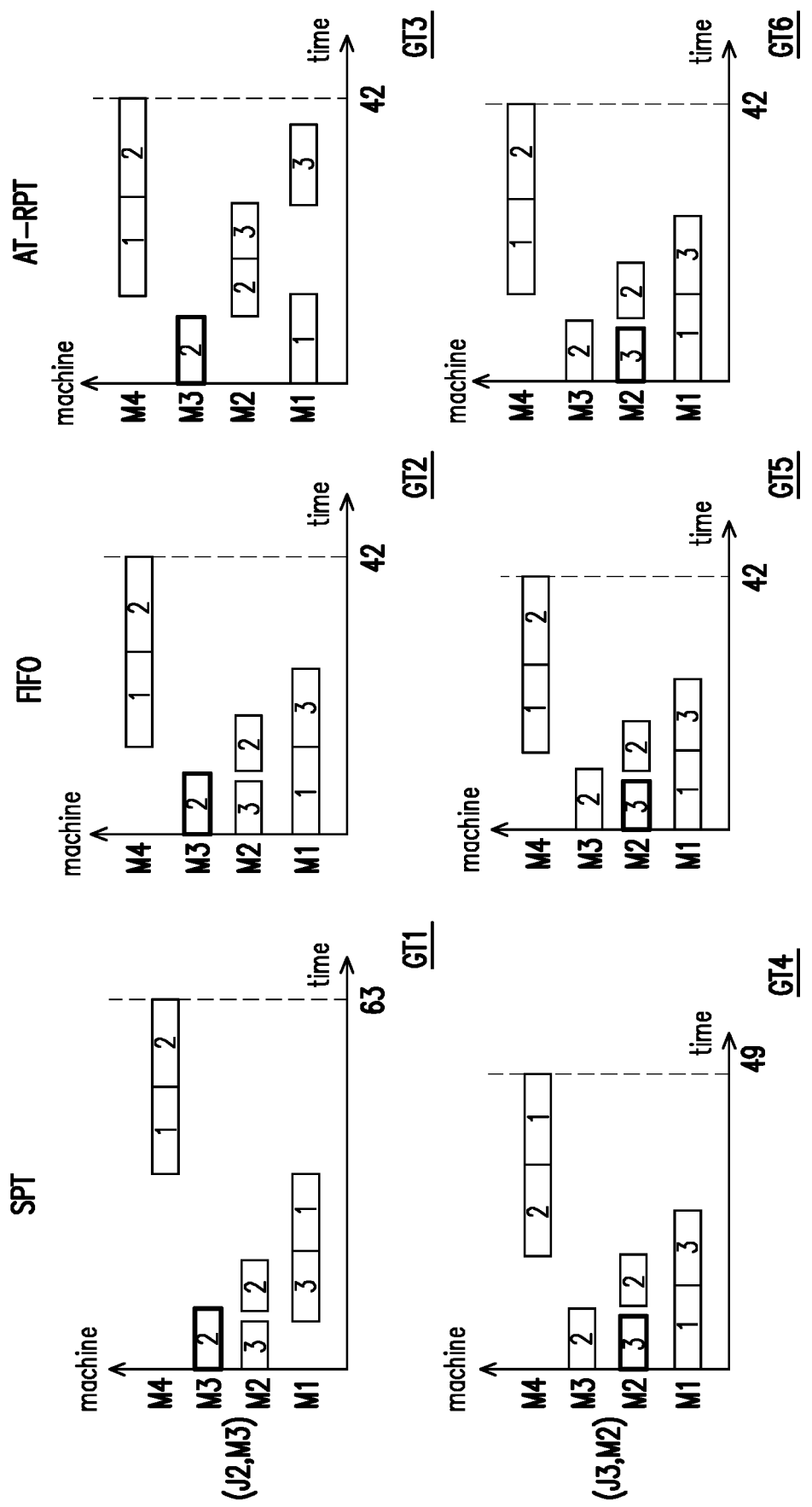

Referring to FIG. 4C, in this embodiment, the processor 130 lists the candidate operation (J2, M3) as the next operation of the schedule. At this time, a schedule pre-state in the schedule includes only one production operation (J2, M3). When the scheduling proceeds to the second level, the third level, or more levels of the tree topology, the number of the operations in the schedule pre-state increases accordingly. Then, the processor 130 performs the scheduling simulation respectively according to the SPT, FIFO, and AT-RPT rules, so as to acquire the simulated scheduling results as shown in Gantt charts GT1 to GT3. On the other hand, when the processor 130 lists the candidate operation (J3, M2) as the next operation of the schedule, the schedule pre-state in the schedule at this time includes only one production operation (J3, M2). Then, the processor 130 performs the scheduling simulation respectively according to the SPT, FIFO, and AT-RPT rules, so as to acquire the simulated scheduling results as shown in Gantt charts GT4 to GT6.

For example, the Gantt chart GT1 lists the production operation (J2, M3) as the first operation in the schedule and sorts the simulated scheduling results of the order lists J1, J2, and J3 according to the SPT rule. It is known from the Gantt chart GT1 that, when the production operation (J2, M3) is listed as the first operation in the schedule and the scheduling simulation is performed according to the SPT rule, the total completion time required by the order lists J1, J2, and J3 is 63 time units. Accordingly, when the production operation (J2, M3) is listed as the first operation in the schedule and the scheduling simulation is performed according to the FIFO rule, the total completion time required by the order lists J1, J2, and J3 is 42 time units; and when the scheduling simulation is performed according to the AT-RPT rule, the total completion time required by the order lists J1, J2, and J3 is 42 time units as well.

In another example, the Gantt chart GT4 lists the production operation (J3, M2) as the first operation in the schedule and sorts the simulated scheduling results of the order lists J1, J2, and J3 according to the SPT rule. It is known from the Gantt chart GT4 that, when the production operation (J3, M2) is listed as the first operation in the schedule and the scheduling simulation is performed according to the SPT rule, the total completion time required by the order lists J1, J2, and J3 is 49 time units. Accordingly, when the production operation (J3, M2) is listed as the first operation in the schedule and the scheduling simulation is performed according to the FIFO rule, the total completion time required by the order lists J1, J2, and J3 is 42 time units; and when the scheduling simulation is performed according to the AT-RPT rule, the total completion time required by the order lists J1, J2, and J3 is 42 time units as well.

After acquiring the simulated scheduling results, the processor 130 respectively integrates the simulated scheduling results of multiple schedule pre-states corresponding to each dispatching rule, so as to acquire the scheduling indicators of the candidate operations.

Figure 4D:
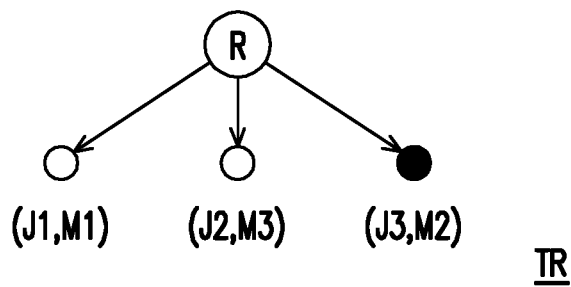

As shown in FIG. 4D, the total completion times of the candidate operation (J2, M3) corresponding to the SPT, FIFO, and AT-RPT rules are 63, 42, and 42 time units respectively, and the processor 130 calculates an average of the total completion times and takes it as the scheduling indicator of the candidate operation (J2, M3). In this embodiment, the scheduling indicator of the candidate operation (J2, M3) is 49 time units. On the other hand, the total completion times of the candidate operation (J3, M2) corresponding to the SPT, FIFO, and AT-RPT rules are 49, 42, and 42 time units respectively, and the processor 130 calculates an average of the total completion times and takes it as the scheduling indicator of the candidate operation (J3, M2). In this embodiment, the scheduling indicator of the candidate operation (J3, M2) is 44.3 time units.

Likewise, in another embodiment, for example, the processor 130 may also calculate a weighted average of the total completion times of the candidate operations corresponding to each dispatching rule, instead of the average, so as to acquire the corresponding scheduling indicator. For example, the processor 130 may set a weight according to the correlations between each dispatching rule and the scheduling goals. When the dispatching rule has a higher correlation with the scheduling goals, the weight is set higher; and when the dispatching rule has a lower correlation with the scheduling goals, the weight is set lower. Nevertheless, the disclosure is not limited thereto.

Likewise, in some embodiments, for example, two or more candidate operations have the same best scheduling indicator. In such a case, for example, the processor 130 selects the candidate operation that has the higher execution priority among the candidate operations as an elected operation, or randomly selects one of the candidate operations as the elected operation, or modify the set weight for recalculation. Nevertheless, the disclosure is not limited thereto.

In Step S270, the processor 130 performs scheduling according to the scheduling indicators. In this embodiment, the processor 130 selects the candidate operation corresponding to the best scheduling indicator as the elected operation via the node selection module 124, and joins the elected operation as the next operation in the schedule via the tree scheduling module 122.

As shown in FIG. 4D, the scheduling indicator of the candidate operation (J3, M2) is 44.3, which is smaller than the scheduling indicator 49 of the candidate operation (J2, M3). Therefore, for the scheduling goal of minimum total completion time, the scheduling indicator of the candidate operation (J3, M2) is superior to the scheduling indicator of the candidate operation (J2, M3). More specifically, the scheduling indicator of the candidate operation (J3, M2) is the best scheduling indicator in the current level of the tree topology TR, and the scheduling indicator of the candidate operation (J2, M3) is the second best scheduling indicator in the current level of the tree topology TR. In this embodiment, the candidate operation (J3, M2) corresponding to the best scheduling indicator is selected as the elected operation, and this elected operation is joined as the next operation of the schedule.

Based on Step S240 to Step S270 described above, the nodes of the first level of the tree topology are developed, and one of the nodes is selected to join the schedule. Likewise, the selected node is used as the new starting node, and Step S240 to Step S270 are repeated, so as to develop the nodes of the second level of the tree topology TR, and one of the nodes is selected to join the schedule, and so on.

Figure 4E:
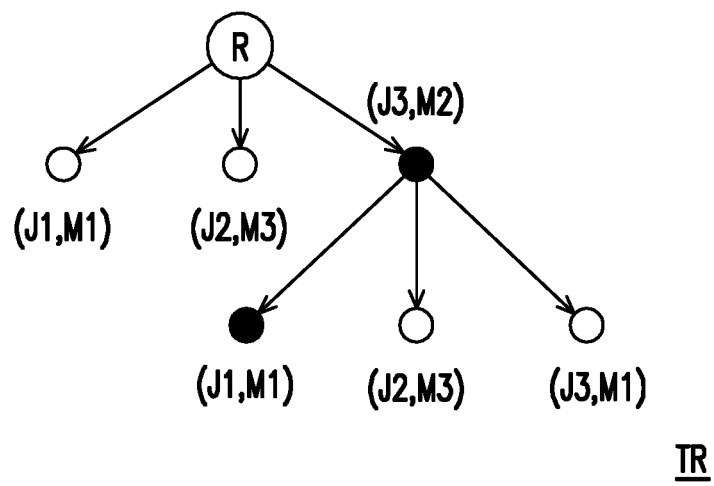

In this embodiment, as shown in FIG. 4E, the production operation (J3, M2) is used as the new starting node for the processor 130 to develop the nodes of the second level, which are the production operations (also referred to as prior operations) (J1, M1), (J2, M3), and (J3, M1). Then, the processor 130 selects the candidate operations (J1, M1) and (J2, M3) in a similar manner, and further selects the elected operation (J1, M1) therefrom. Details about how to select the prior operations from the production operations of the order lists J1, J2, and J3, select the candidate operations from the prior operations, and select the elected operation from the candidate operations have been specified in the paragraphs above and thus are not repeated hereinafter.

Figure 4F:
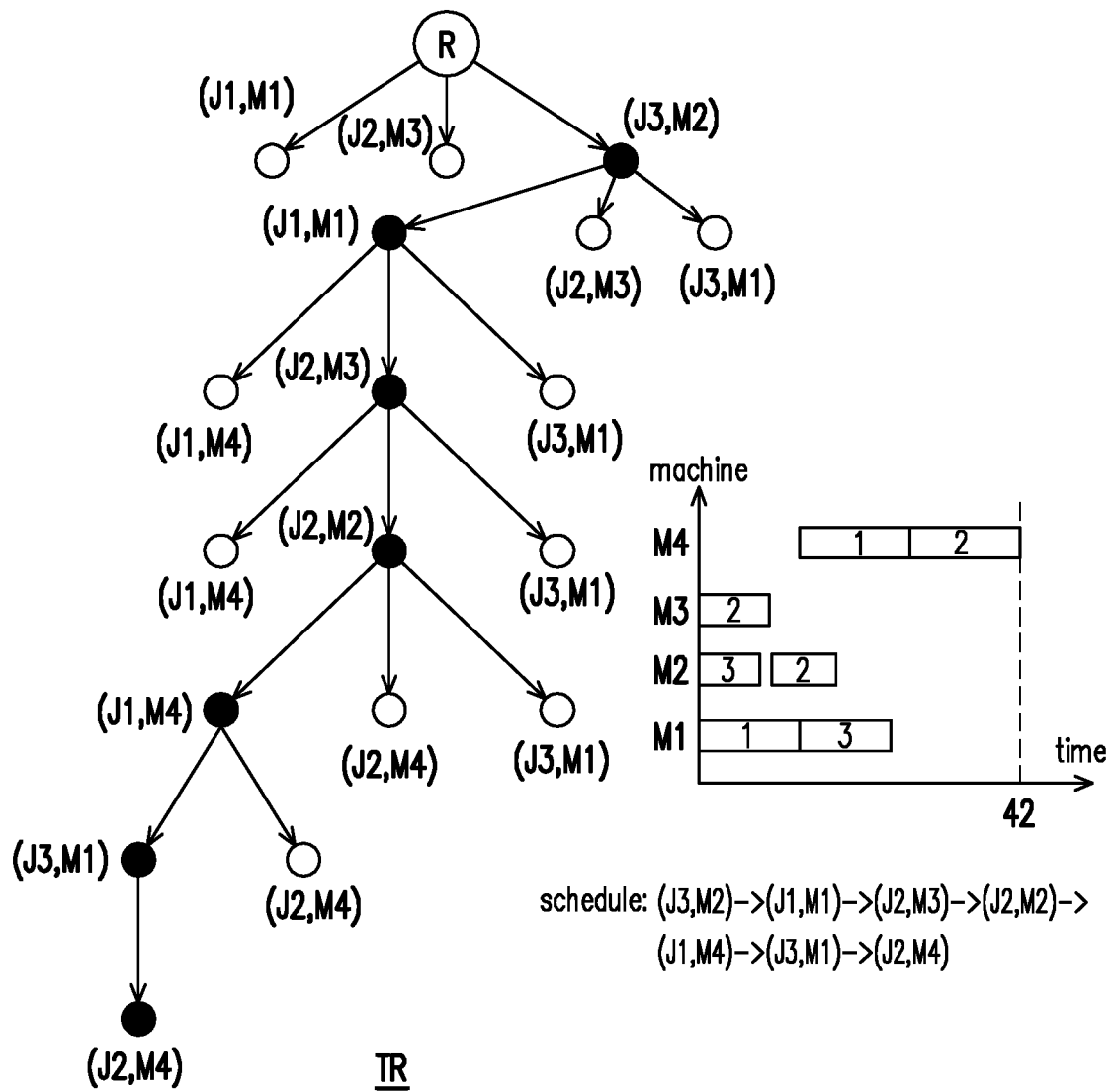

By repeating Step S240 to Step S270 over and over again, the production operations of the order lists J1, J2, and J3 are joined into the schedule one by one, and at last, the scheduling result as shown in the Gantt chart and the tree topology TR of FIG. 4F is obtained, wherein the production operations in the schedule are (J3, M2), (J1, M1), (J2, M3), (J2, M2), (J1, M4), (J3, M1), and (J2, M4) in order, and the total completion time is 42 time units.

In an embodiment, for some particular order lists which are urgent, in addition to the minimum total completion time, the minimum order delay time is added as the scheduling goal for selecting the dispatching rules. Another embodiment is provided below to illustrate a case where the dispatching rules are selected according to different scheduling goals, and details of some steps that have been specified in the paragraphs above are not repeated hereinafter.

In this embodiment, the following Table 2 is the order list received by the receiving device 110. A difference between Table 2 and Table 1 is that Table 2 further includes delivery time information of the order list in the last column for specifying the completion time of each order list. For example, the delivery time of the order list J1 is 60 time units; the delivery time of the order list J2 is 40 time units; and the delivery time of the order list J3 is 38 time units.

TABLE 2

| J1 | M1(12) | M4(15) |        | 60 |
|----|--------|--------|--------|----|
| J2 | M3(10) | M2(9)  | M4(15) | 40 |
| J3 | M2(9)  | M1(12) |        | 38 |

If a production multiple (i.e., delivery time/minimum required total processing time) is used as the indicator, the production multiple of the order list J1 is 2.2 (60/(12+15)=2.2), the production multiple of the order list J2 is 1.1 (40/(10+9+15)=1.1), and the production multiple of the order list J3 is 1.8 (38/(9+12)=1.8). Therefore, in this embodiment, the order list J2 is relatively urgent.

Based on the scheduling goal of minimum order delay time, the FIFO rule is not selected in this embodiment. Specifically, referring to FIG. 3, the FIFO rule has a low correlation with the minimum order delay time (one black dot). Therefore, in this embodiment, the SPT, AT-RPT, and MDD rules that are more correlated with the scheduling goal of minimum order delay time are selected.

Figure 5A:
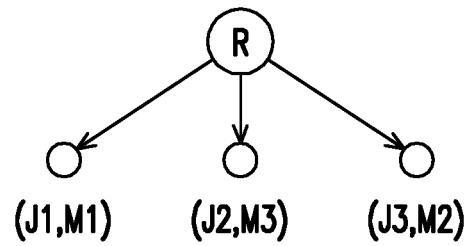
FIG. 5A to FIG. 5F are schematic diagrams showing a scheduling method according to an embodiment of the disclosure.

FIG. 5A to FIG. 5F are schematic diagrams showing a scheduling method according to an embodiment of the disclosure. Referring to FIG. 5A to FIG. 5F, as shown in FIG. 5A, the nodes of the first level developed in this embodiment are the production operations (also referred to as prior operations) (J1, M1), (J2, M3), and (J3, M2).

Figure 5B:
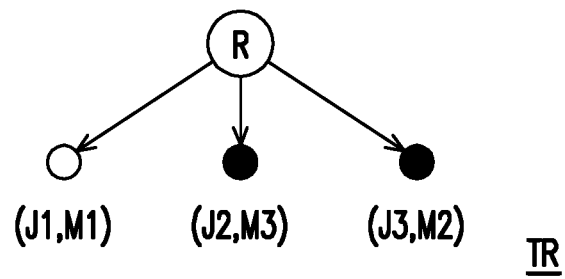

As shown in FIG. 5B, according to the SPT rule, the prior operations (J1, M1), (J2, M3), and (J3, M2) are sorted as 3, 2, and 1 respectively; and according to the AT-RPT rule, the prior operations (J1, M1), (J2, M3), and (J3, M2) are sorted as 2, 1, and 3 respectively.

When the prior operations (J1, M1), (J2, M3), and (J3, M2) are sorted according to the MDD rule, for example, the processor 130 calculates maximums of "delivery time" and "current time plus total remaining processing time" respectively to be used as the priority indicator. For example, the delivery time of the prior operation (J1, M1) is 60 time units, and the current time plus the total remaining processing time is 27 (0+27=27) time units. Therefore, the priority indicator of the prior operation (J1, M1) is 60. Likewise, the priority indicator of the prior operation (J2, M3) is 40 (Max {40, 0+34}=40); and the priority indicator of the prior operation (J3, M2) is 38 (Max {38, 0+21}=38). Therefore, the prior operations (J1, M1), (32, M3), and (J3, M2) are sorted as 3, 2, and 1 respectively. In other words, when scheduling is performed according to the MDD rule, the operation (J3, M2) has priority over the operation (J2, M3), and the operation (J2, M3) has priority over the operation (J1, M1).

In this embodiment, as shown in FIG. 5B, the processor 130 calculates the execution priority of the prior operations (J1, M1), (J2, M3), and (J3, M2) as 2.666667, 1.666667, and 1.666667 according to the sorted results above, and selects the candidate operations (J2, M3) and (J3, M2) therefrom.

Figure 5C:
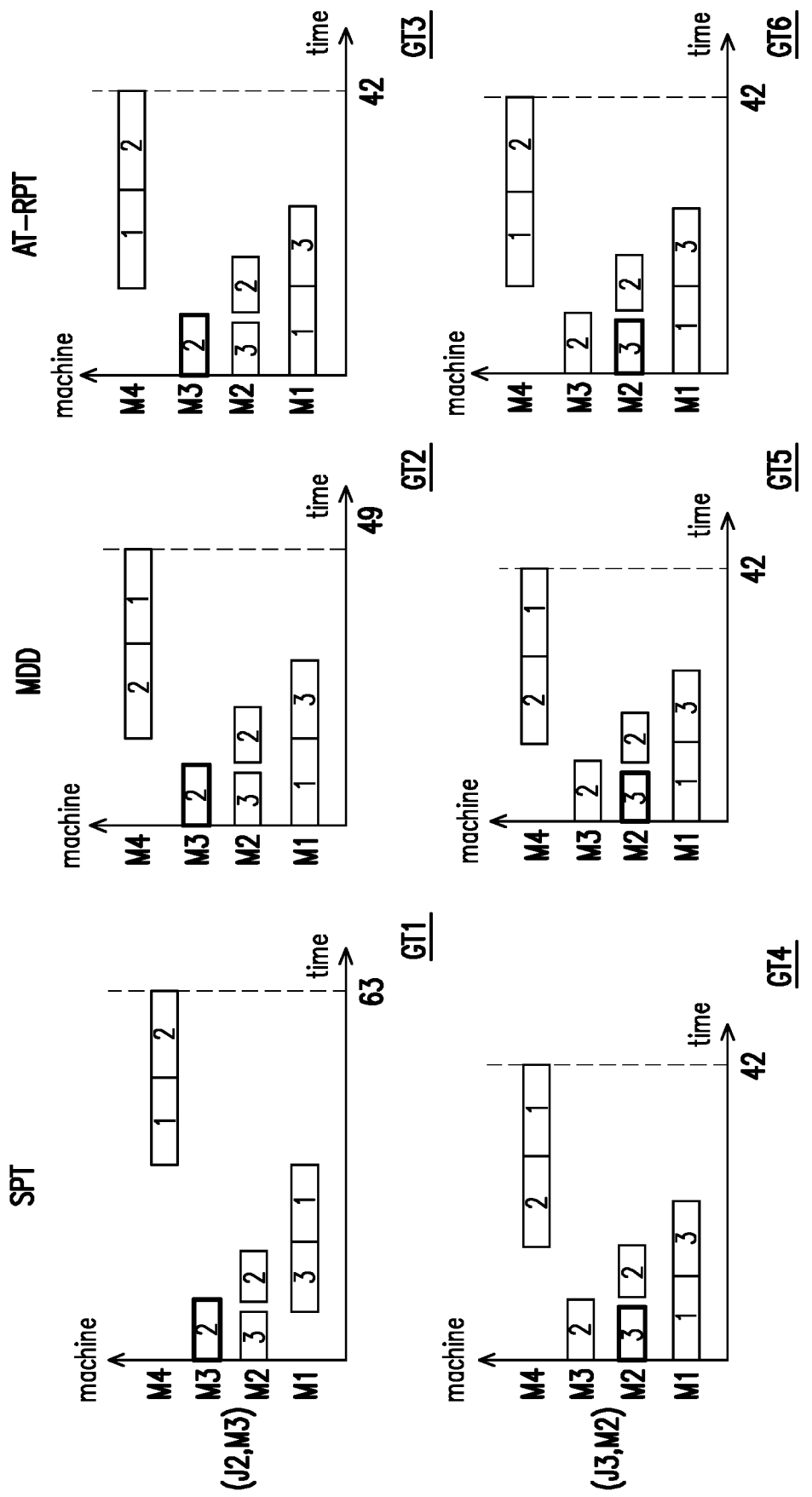

Then, the processor 130 respectively lists the candidate operations (J2, M3) and (J3, M2) as the next operation in the schedule to acquire two schedule pre-states, and thereafter, performs a scheduling simulation on the two schedule pre-states according to each dispatching rule. Accordingly, a plurality of simulated scheduling results corresponding to each dispatching rule as shown in the Gantt charts GT1 to GT6 of FIG. 5C are acquired. For example, the Gantt chart GT2 lists the production operation (J2, M3) as the first operation in the schedule and performs the scheduling simulation of the order lists J1, J2, and J3 according to the MDD rule. It is known from the Gantt chart GT2 that, when the production operation (J2, M3) is listed as the first operation in the schedule and the scheduling simulation is performed according to the MDD rule, the total completion time required by the order lists J1, J2, and J3 is 49 time units, and so on.

Figure 5D:
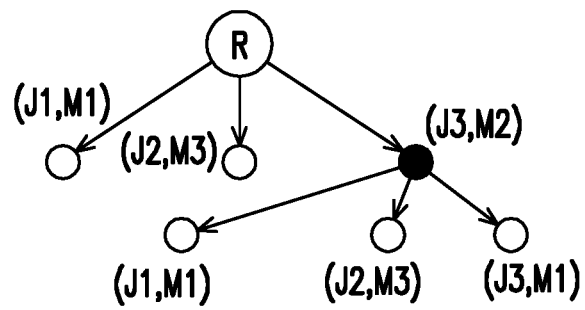

Next, as shown in FIG. 5D, the processor 130 calculates the scheduling indicator of the candidate operation (J2, M3) as 51.3 time units, and the scheduling indicator of the candidate operation (J3, M2) as 44.3 time units. Accordingly, the processor 130 joins the candidate operation (J3, M2) corresponding to the best scheduling indicator 44.3 as the next operation of the schedule, and continues to develop the nodes of the next level. In this embodiment, the nodes of the next level are the production operations (also referred to as prior operations) (J1, M1), (J2, M3), and (J3, M1).

Figure 5E:
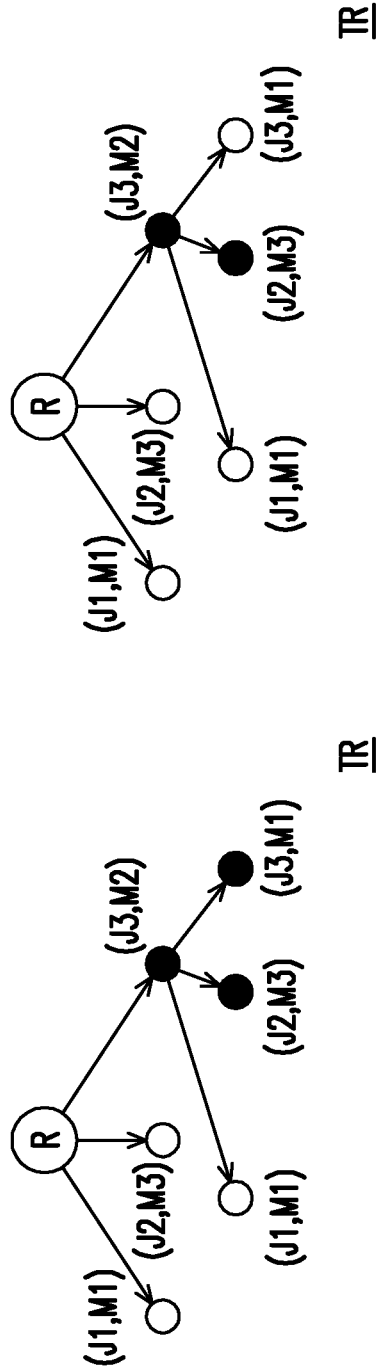

Likewise, as shown in FIG. 5E, the processor 130 selects the candidate operations (J2, M3) and (J3, M1) from the prior operations (J1, M1), (J2, M3), and (J3, M1) according to the execution priority, and then respectively lists the candidate operations (J2, M3) and (J3, M1) as the next operation in the schedule to acquire two schedule pre-states, and thereafter, performs a scheduling simulation on the two schedule pre-states according to each dispatching rule.

In this embodiment, after the candidate operation (J2, M3) is listed as the next operation in the schedule, the schedule pre-state including the production operations (J3, M2) and (J2, M3) sequentially is acquired; and after the candidate operation (J3, M1) is listed as the next operation in the schedule, the schedule pre-state including the production operations (J3, M2) and (J3, M1) sequentially is acquired. Then, the processor performs the scheduling simulation on each schedule pre-state according to multiple dispatching rules to acquire a plurality of simulated scheduling results, so as to acquire the scheduling indicators of the candidate operations (J2, M3) and (J3, M1).

As shown in FIG. 5E, the processor 130 calculates the scheduling indicator of the candidate operation (J2, M3) as 44.3 time units, and the scheduling indicator of the candidate operation (J3, M1) as 58.3 time units. Accordingly, as shown in FIG. 5E, the processor 130 joins the candidate operation (J2, M3) corresponding to the best scheduling indicator 44.3 as the next operation of the schedule, and continues to develop the nodes of the next level.

It should be noted that, as shown in the Gantt chart and the tree topology TR of FIG. 4F, in the embodiment where the group decision-making is based on the SPT, FIFO, and AT-RPT rules, the first two operations of the finally acquired scheduling result are (J3, M2) and (J1, M1). However, as shown in the Gantt chart and the tree topology TR of FIG. 5F, in this embodiment where the group decision-making is based on the SPT, MDD, and AT-RPT rules, the first two operations of the final scheduling result acquired by performing scheduling on the same order list are (J3, M2) and (J2, M3). It is known from the above that, since the dispatching rules are selected according to the scheduling goal of minimum order delay time in this embodiment, the production operation in the order list J2 is advanced to the second level (i.e., the second operation in the schedule) of the tree topology to be executed.

Figure 5F:
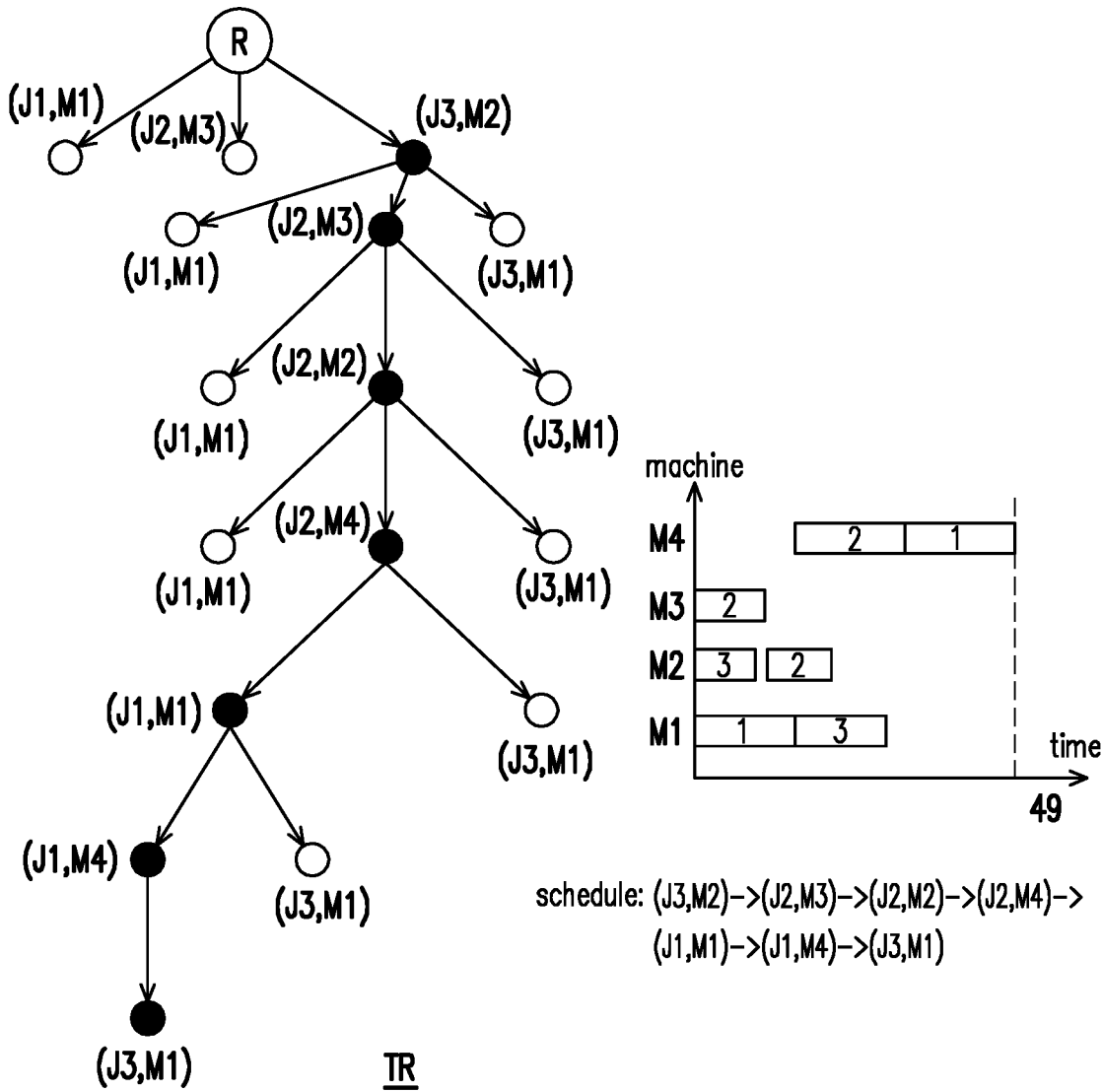

By repeating the steps described above, the scheduling result as shown in the Gantt chart and the tree topology of FIG. 5F is obtained, wherein the production operations in the schedule are (J3, M2), (J2, M3), (J2, M2), (J2, M4), (J1, M1), (J1, M4), and (J3, M1) in order, the total completion time is 49 time units, and the completion time of the order list J2 is 34 time units. Since the total completion time is still the condition for selecting the nodes, the scheduling method provided in this embodiment of the disclosure makes it possible to complete the order list J2 within the delivery time of 40 time units without sacrificing too much total completion time.

In the embodiment described above, after selecting the elected operation from the candidate operations, the processor 130 joins the elected operation into the schedule as the next operation, so as to join the production operations into the schedule one by one. It should be noted that, in some embodiments, the processor 130 searches for nodes by recursion, so as to improve the quality of the schedule. Specifically, subject to certain conditions, the processor 130 may replace the elected operation that has been joined into the schedule with another candidate operation in the same level as the elected operation in the tree topology, and continue with the scheduling. An embodiment is provided below to illustrate how to search for nodes by recursion.

In this embodiment, the following Table 3 is the order list received by the receiving device 110, and the minimum total completion time is the only scheduling goal.

TABLE 3

| J1 | M1(13) | M2(53) |
| J2 | M1(54) | M2(42) |
| J3 | M2(1) | M1(9) |
| J4 | M1(78) | M2(50) |

Figure 6A:
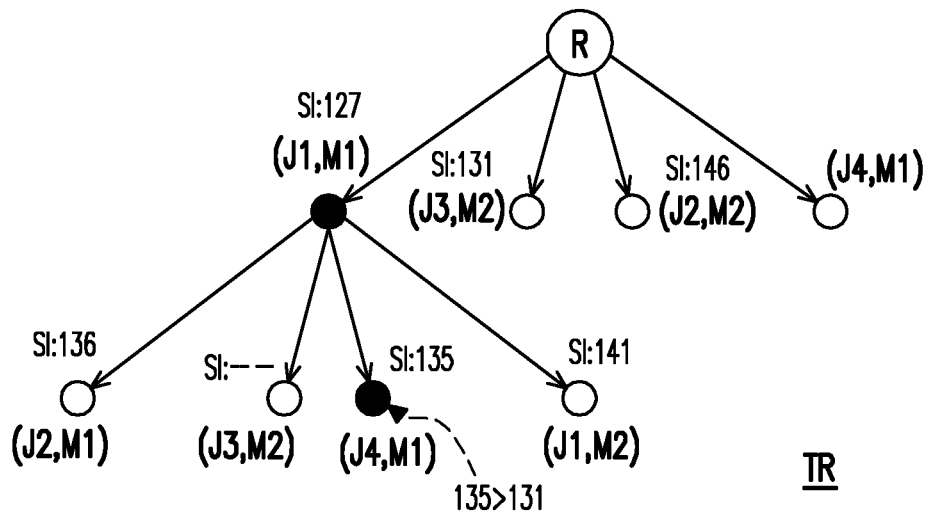
FIG. 6A to FIG. 6C are schematic diagrams showing a scheduling method according to an embodiment of the disclosure.

FIG. 6A is a schematic diagram showing a scheduling method according to an embodiment of the disclosure. Referring to FIG. 6A, after Step S240 to Step S270 are performed for the first time, the production operations (J1, M1), (J3, M2), (J2, M2), and (J4, M1) as the nodes of the first level of the tree topology TR are filtered to acquire the candidate operations (J1, M1), (J3, M2), and (J2, M2), wherein the scheduling indicators SI thereof are 127, 131, and 146 time units respectively, and the elected operation of the first level is the production operation (J1, M1) corresponding to the best scheduling indicator SI (i.e., 127 time units).

Then, the processor 130 takes the elected operation (J1, M1) as the new starting node to execute Step S240 to Step S270 again, and then filters the production operations (J2, M1), (J3, M2), (J4, M1), and (J1, M2) that are the nodes of the second level of the tree topology TR to acquire the candidate operations (J2, M1), (J4, M1), and (J1, M2), wherein the scheduling indicators SI thereof are 136, 135, and 141 time units, and the elected operation of the second level is the production operation (J4, M1) corresponding to the best scheduling indicator SI (i.e., 135 time units).

It should be noted that, for the scheduling goal of minimum total completion time, the scheduling indicator SI (i.e., 135 time units) of the elected operation (J4, M1) of the second level is inferior to the second best scheduling indicator SI (i.e., 131 time units) of the candidate operation (J3, M2) in the first level. This situation means that if the production operation (J1, M1) corresponding to the best scheduling indicator (i.e., 127 time units) is joined as the next operation of the schedule in the first level of the tree topology TR, a total completion time of at least 135 time units is required. Therefore, the processor 130 updates the scheduling indicator of the production operation (J1, M1) to 135 time units. In addition, the processor 130 further replaces the elected operation of the first level with the production operation (J3, M2) corresponding to the second best scheduling indicator (i.e., 131 time units) in the first level, and replaces the production operation (J1, M1) that has been joined into the schedule with this elected operation (J3, M2). Thereafter, the new elected operation in the first level is used as the starting node for re-developing the nodes of the second level of the tree topology TR.

Figure 6B:
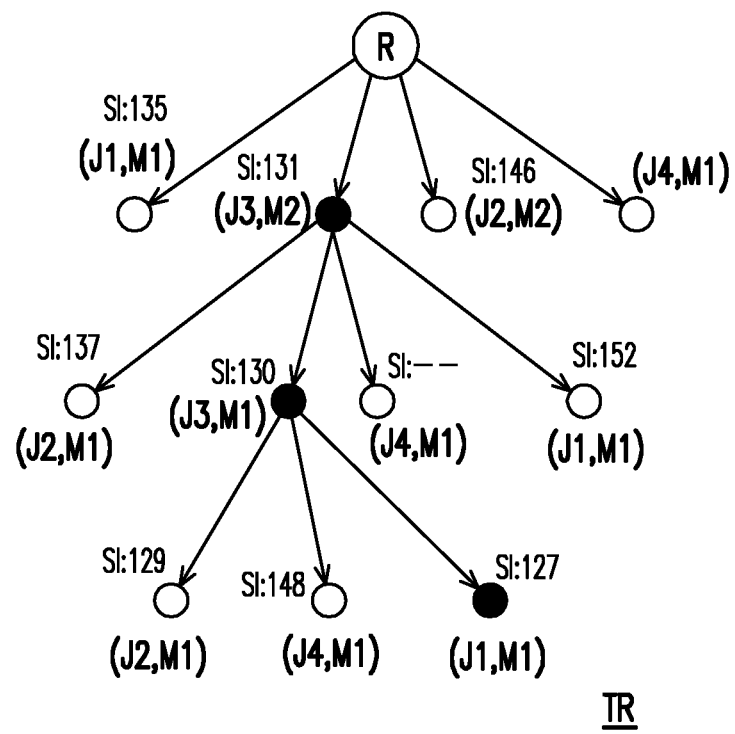

Referring to FIG. 6B, the nodes of the next level that are developed downward from the elected operation (J3, M2) are the production operations (J2, M1), (J3, M1), (J4, M1), and (J1, M1), and the candidate operations acquired through filtering are (J2, M1), (J3, M1), and (J1, M1), wherein the scheduling indicators SI thereof are 137, 130, and 152 time units, and the elected operation of the second level is the production operation (J3, M1) corresponding to the best scheduling indicator SI (i.e., 130 time units).

The scheduling indicator SI (i.e., 130 time units) of the elected operation (J3, M1) of the second level is superior to the second best scheduling indicator SI (i.e., 135 time units) of the candidate operation (J1, M1) in the first level. Therefore, the processor 130 joins the elected operation (J3, M1) as the next production operation following the production operation (J3, M2) in the schedule. It should be noted that, in other embodiments, if the scheduling indicator SI of the elected operation of the second level is equal to the second best scheduling indicator of the candidate operation in the first level, the processor 130 continues to join the elected operation of the second level as the next production operation in the schedule.

Then, the processor 130 takes the elected operation (J3, M1) as the new starting node to execute Step S240 to Step S270 again, and then filters the production operations (J2, M1), (J4, M1), and (J1, M1) that are the nodes of the third level of the tree topology TR to acquire the candidate operations (J2, M1), (J4, M1), and (J1, M1), wherein the scheduling indicators SI thereof are 129, 148, and 127 time units, and the elected operation of the third level is the production operation (J1, M1) corresponding to the best scheduling indicator SI (i.e., 127 time units).

Figure 6C:
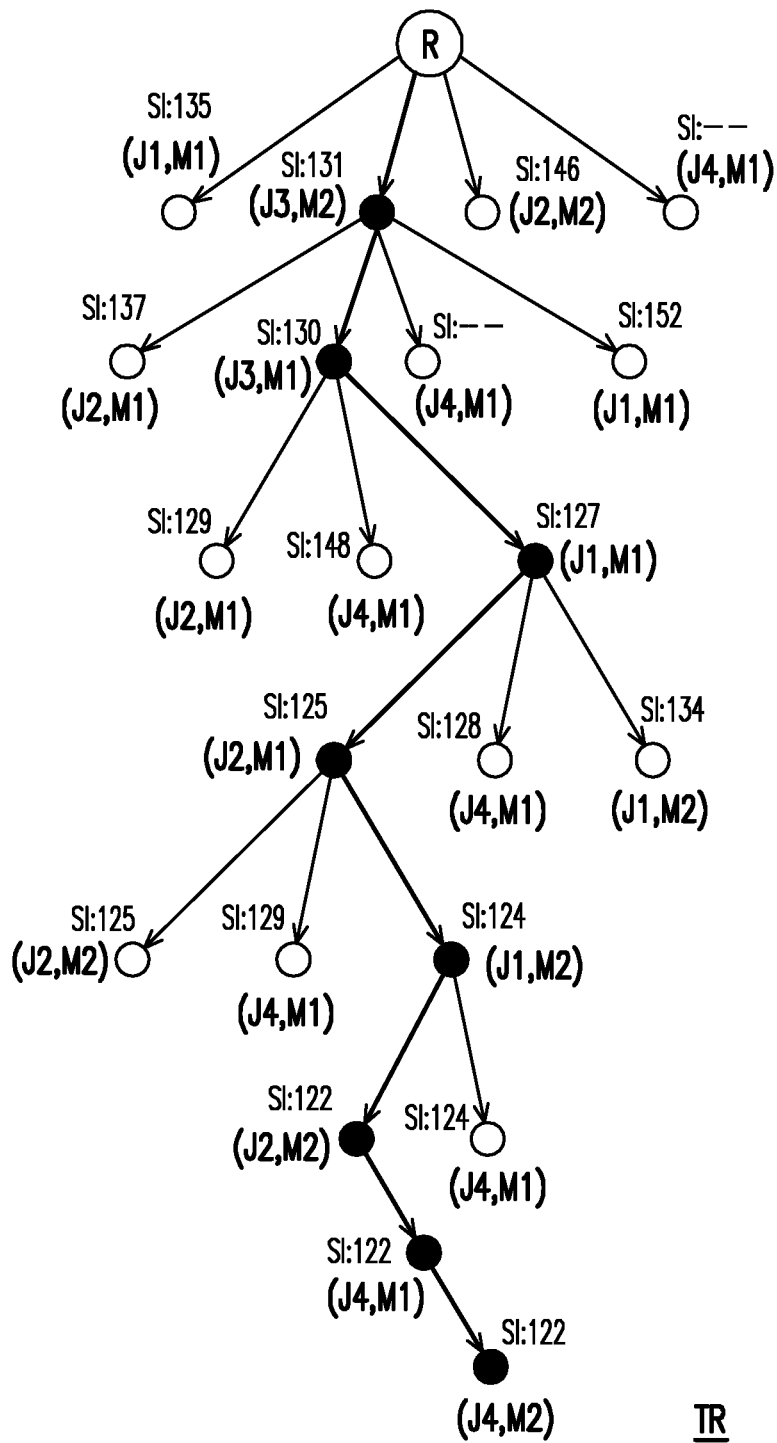

The scheduling indicator SI (i.e., 127 time units) of the elected operation (J1, M1) of the third level is superior to the second best scheduling indicator SI (i.e., 137 time units) of the candidate operation (J2, M1) in the second level. Therefore, the processor 130 joins the elected operation (J1, M1) as the next production operation following the production operation (J3, M1) in the schedule. By repeating the steps described above in the same manner, the scheduling result as shown in the tree topology TR of FIG. 6C is obtained, wherein the production operations in the schedule are (J3, M2), (J3, M1), (J1, M1), (J2, M1), (J1, M2), (J2, M2), (J4, M1), and (J4, M2) in order, and the total completion time is 122 time units.

To sum up, in the tree search-based scheduling method and the electronic apparatus using the method as provided in the embodiments of the disclosure, multiple dispatching rules are used simultaneously, and the risk of erroneous scheduling is reduced effectively by adopting group decision-making based dispatching rules. Particularly, according to the embodiments of the disclosure, the dispatching rules used during the scheduling may be selected from the rule library according to the requirements and goals of the current schedule (e.g., minimum total completion time), and after the dispatching rules to be used are selected, scheduling is performed level by level by a tree search algorithm. Therefore, the scheduling method provided in the embodiments of the disclosure makes it possible to perform scheduling according to different needs of the user. Furthermore, according to the embodiments of the disclosure, the nodes are found by recursion during tree search, by which the scheduling is completed in a reasonable processing time with favorable scheduling quality.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A tree search-based scheduling method of an electronic apparatus, the tree search-based scheduling method comprising:
   receiving a plurality of order lists and initializing a schedule, wherein each of the order lists comprises a plurality of production operations;
   selecting one of the plurality of production operations in each of the order lists to acquire a plurality of prior operations of the order lists, wherein the selected one of the plurality of production operations is not included in the schedule and is sorted foremost among the plurality of production operations;
   calculating an execution priority of the prior operations according to a plurality of dispatching rules, and selecting a plurality of candidate operations from the prior operations according to the execution priority;
   assigning the candidate operations as a next operation of the schedule respectively to acquire a plurality of schedule pre-states corresponding to the candidate operations;
   performing a scheduling simulation on the schedule pre-states respectively according to the dispatching rules to calculate a plurality of simulated scheduling results of the schedule pre-states corresponding to each of the dispatching rules;
   calculating a weighted average or an average of the simulated scheduling results corresponding to the dispatching rules for each of the candidate operations to serve as a scheduling indicator of the candidate operation; and
   performing the schedule according to the scheduling indicators of the candidate operations.

2. The tree search-based scheduling method according to claim 1, further comprising:
   creating a rule library, wherein the rule library records a plurality of available dispatching rules and a plurality of correlations between each of the available dispatching rules and a plurality of scheduling goals, wherein the scheduling indicators are associated with one of the scheduling goals.

3. The tree search-based scheduling method according to claim 2, further comprising:
   selecting one of the scheduling goals; and
   selecting the dispatching rules from the available dispatching rules according to the correlations between the available dispatching rules and the selected scheduling goal.

4. The tree search-based scheduling method according to claim 1, wherein calculating the execution priority of the prior operations according to the dispatching rules comprises:
   sorting the prior operations respectively according to the dispatching rules; and
   calculating a weighted average or an average of a plurality of sorted results corresponding to the dispatching rules for each of the prior operations to calculate the execution priority.

5. The tree search-based scheduling method according to claim 1, wherein the scheduling indicators comprise a best scheduling indicator and a second best scheduling indicator, wherein performing the schedule according to the scheduling indicators comprises:
   selecting the candidate operation corresponding to the best scheduling indicator as an elected operation; and
   joining the elected operation as the next operation of the schedule.

6. The tree search-based scheduling method according to claim 5, further comprising:
   repeating the steps to continue to select the production operation, which has not yet been joined into the schedule and is sorted foremost, in each of the order lists to acquire a plurality of prior operations of the order lists, select a plurality of candidate operations from the prior operations, acquire a plurality of scheduling indicators of the candidate operations, and perform the schedule according to the scheduling indicators to select another elected operation from the production operations of the order lists;
   joining the selected another elected operation as a next operation of the schedule when determining that the scheduling indicator of the selected another elected operation is greater than or equal to the second best scheduling indicator; and
   replacing a last operation of the schedule with the candidate operation corresponding to the second best scheduling indicator when determining that the scheduling indicator of the selected another elected operation that is selected is less than the second best scheduling indicator.

7. The tree search-based scheduling method according to claim 6, wherein when determining that the scheduling indicator of the selected another elected operation is less than the second best scheduling indicator, the tree search-based scheduling method further comprises:
   updating the scheduling indicator of the candidate operation corresponding to the best scheduling indicator.

8. An electronic apparatus, comprising:
   a receiving device configured to receive data;
   a storage device configured to store a plurality of modules; and
   a processor coupled to the receiving device and the storage device and configured to load and execute the modules, wherein the modules comprise:
      a data acquisition module configured to receive a plurality of order lists via the receiving device, wherein each of the order lists comprises a plurality of production operations;
      a tree scheduling module configured to initialize a schedule;
      a node filtering module configured to:
         select one of the plurality of production operations in each of the order lists to acquire a plurality of prior operations of the order lists, wherein the selected one of the plurality of production operations is not included in the schedule and is sorted foremost among the plurality of production operations; and
         calculate an execution priority of the prior operations according to a plurality of dispatching rules, and select a plurality of candidate operations from the prior operations according to the execution priority; and
      a node selection module configured to:
         assign the candidate operations as a next operation of the schedule respectively to acquire a plurality of schedule pre-states corresponding to the candidate operations;

perform a scheduling simulation on the schedule pre-states respectively according to the dispatching rules to calculate a plurality of simulated scheduling results of the schedule pre-states corresponding to each of the dispatching rules; and calculate a weighted average or an average of the simulated scheduling results corresponding to the dispatching rules for each of the candidate operations to serve as a scheduling indicator of the candidate operation, wherein the tree scheduling module is further configured to perform the schedule according to the scheduling indicators of the candidate operations.

9. The electronic apparatus according to claim 8, wherein the storage device is further configured to record a rule library, wherein the rule library records a plurality of available dispatching rules and a plurality of correlations between each of the available dispatching rules and a plurality of scheduling goals.

10. The electronic apparatus according to claim 9, wherein the processor selects one of the scheduling goals, and selects the dispatching rules from the available dispatching rules according to the correlations between the available dispatching rules and the selected scheduling goal.

11. The electronic apparatus according to claim 8, wherein the node filtering module is configured to:

sort the prior operations respectively according to the dispatching rules; and calculate a weighted average or an average of a plurality of sorted results corresponding to the dispatching rules for each of the prior operations to calculate the execution priority.

12. The electronic apparatus according to claim 8, wherein the scheduling indicators comprise a best scheduling indicator and a second best scheduling indicator, wherein the tree scheduling module is further configured to:

select the candidate operation corresponding to the best scheduling indicator as an elected operation; and join the elected operation as the next operation of the schedule.

13. The electronic apparatus according to claim 12, wherein the processor is further configured to:

repeatedly execute the node filtering module and the node selection module to select another elected operation;

join the selected another elected operation as a next operation of the schedule when determining that the scheduling indicator of the selected another elected operation is greater than or equal to the second best scheduling indicator; and replace a last operation of the schedule with the candidate operation corresponding to the second best scheduling indicator when determining that the scheduling indicator of the selected another elected operation is less than the second best scheduling indicator.

14. The electronic apparatus according to claim 13, wherein when determining that the scheduling indicator of the selected another elected operation is less than the second best scheduling indicator, the processor is further configured to:

update the scheduling indicator of the candidate operation corresponding to the best scheduling indicator.

* * * * *